(12) United States Patent
Lee et al.

(10) Patent No.: US 8,825,262 B2
(45) Date of Patent: Sep. 2, 2014

(54) SYSTEM AND METHOD OF DERIVING PARKING TRAJECTORY FOR VEHICLE

(75) Inventors: Jong Ho Lee, Gyeonggi-do (KR); Jae Hwan Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 134 days.

(21) Appl. No.: 13/488,705

(22) Filed: Jun. 5, 2012

(65) Prior Publication Data

US 2013/0151060 A1     Jun. 13, 2013

(30) Foreign Application Priority Data

Dec. 9, 2011 (KR) .......................... 10-2011-0131837

(51) Int. Cl.
| | |
|---|---|
| *G01C 22/00* | (2006.01) |
| *G05D 1/00* | (2006.01) |
| *B62D 15/02* | (2006.01) |
| *B60R 1/00* | (2006.01) |

(52) U.S. Cl.
CPC ................ *B62D 15/027* (2013.01); *B60R 1/00* (2013.01); *B62D 15/0275* (2013.01)
USPC .......................................................... 701/25

(58) Field of Classification Search
CPC ..... B62D 15/0275; B62D 15/027; B60R 1/00
USPC .......................................................... 701/25
See application file for complete search history.

(56) References Cited

U.S. PATENT DOCUMENTS

| | | | | |
|---|---|---|---|---|
| 6,654,670 | B2 * | 11/2003 | Kakinami et al. ................. 701/1 |
| 7,012,549 | B2 * | 3/2006 | Mizusawa et al. .......... 340/932.2 |
| 7,272,477 | B2 * | 9/2007 | Oki et al. ......................... 701/36 |
| 7,487,020 | B2 * | 2/2009 | Iwazaki et al. .................. 701/41 |
| 7,940,193 | B2 * | 5/2011 | Yamanaka ................. 340/932.2 |
| 2002/0175832 | A1 * | 11/2002 | Mizusawa et al. .......... 340/932.2 |
| 2004/0201670 | A1 * | 10/2004 | Mizusawa et al. ............. 348/136 |

FOREIGN PATENT DOCUMENTS

| | | | |
|---|---|---|---|
| JP | | 4486891 B2 | 6/2010 |
| KR | 10-2010-0031244 | | 3/2010 |

* cited by examiner

*Primary Examiner* — Mary Cheung
*Assistant Examiner* — Frederick Brushaber
(74) *Attorney, Agent, or Firm* — Edwards Wildman Palmer LLP; Peter F. Corless

(57) ABSTRACT

Disclosed herein is a technique of deriving a parking trajectory for a vehicle. In the technique, a first extension straight line, which includes a linear travel path of the vehicle when the vehicle initially goes in reverse from a neutral position of a steering angle, is calculated upon the vehicle being to go in reverse. A final parking location is obtained based on a calculated length of a parking space and a parking target location in the parking space, and a second extension straight line which includes the final parking location is calculated therefrom. When the vehicle going in reverse along the first extension straight line turns and goes in reverse towards the second extension straight line, an intermediate extension straight line connecting the first extension straight line and the second extension straight line is calculated so that the vehicle is aligned with the second extension straight line.

10 Claims, 7 Drawing Sheets

SYSTEM AND METHOD OF DERIVING PARKING TRAJECTORY FOR VEHICLE

CROSS-REFERENCE TO RELATED ED APPLICATIONS

The present application claims priority to Korean Patent Application No. 10-2011-0131837 filed on Dec. 9, 2011, the entire contents of which is incorporated herein for purposes by this reference.

BACKGROUND OF THE INVENTION

1. Field of the Invention

The present invention relates to a method of deriving a parking trajectory for a vehicle, which derives a parking trajectory based on a reversing linear path within an angle of the radius of rotation for parking, thus improving convenience and reducing the complexity of calculation.

2. Description of the Related Art

Automatic parking systems (auto parking system) have begun to be installed in vehicles as an aide for drivers who ordinarily have a difficult time their car. In conventional auto-parking systems, a driver identifies the location of an obstacle using a camera or an ultrasonic sensor attached to the rear of a vehicle when parking the vehicle. When the driver selects parallel parking or perpendicular parking, the auto-parking system performs a relevant operations required to park the individuals vehicle.

Ordinarily, a camera is installed in such conventional auto-parking systems and is configured to provide the driver is a real time display of the area behind, next to or even in front of the vehicle. Based on the view in the camera, the driver selects a parking space identified by the camera and the auto-parking system automatically controls the steering wheel of the vehicle using sensor values from a plurality of sensors installed around the outer peripheral of the vehicle, thus enabling the vehicle to be safely parked.

FIG. 1 is a diagram illustrating a parking trajectory utilized by a conventional auto-parking system to parallel park a vehicle. In this conventional trajectory calculation, the auto-parking system utilizes a trajectory based on a minimum radius of rotation, and thus the vehicle is turning with a radius R1 around point C to enter the parking space.

Accordingly, the conventional auto-parking system must form a parking trajectory using a formula based on a tangential line between a rotating circle forming the minimum radius of rotation along the trajectory and a straight line when parallel parking a vehicle. However, in order to form a parking trajectory in the form of a continuous trajectory when parallel parking, a steering motor operating the steering wheel must generate a square wave operating signal. However, it is quite difficult for the steering motor to accurately generate this type of square wave operating signal. Thus, as shown in FIG. 2, a certain degree of error exits thereby reducing the effective parking performance of the system.

FIG. 3 is a diagram showing one solution that has been proposed to reduce the error output by the steering motor. In particular, a steering angle is calculated using a trajectory formula required to park a vehicle, and a motor is rotated forwards or backwards at a predetermined angle in compliance with a command signal output from a control unit, so that a parking trajectory satisfying a continuous range for a steering angle is formed, thus reducing an error between a designated ideal parking trajectory and an actual parking trajectory.

However in this solution, the procedure for deriving a trajectory is relatively complicated, thus making it inefficient to calculate parking trajectory of a vehicle in various conditions. Thus, the device in the proposed solution above is not scalable to a multiple different parking situations which a driver may typically encounter in, e.g., a city.

The foregoing is intended merely to aid in the better understanding of the background of the present invention, and is not intended to mean that the present invention falls within the purview of the related art that is already known to those skilled in the art.

SUMMARY OF THE INVENTION

The present invention provides a technique for deriving a parking trajectory of a vehicle. More specifically, the illustrative embodiment of the present invention derives a parking trajectory based on a reversing linear path within an angle of the radius of rotation for parking, thus improving convenience and reducing the complexity of calculation.

In order to accomplish the above object, the present invention provides a parking trajectory for a vehicle that may be executed by a control unit that is configured to calculate a first extension straight line once the vehicle begins going in reverse. The first extension straight line may include a linear travel path for a vehicle when the vehicle initially begins to reverse from a neutral steering wheel position. Next, the control unit is configured to obtain a final parking location based on a calculated length of a parking space and a parking target location in the parking space, and calculate a second extension straight line which includes the final parking location. Finally once the vehicle going in reverse along the first extension straight line turns and goes in reverse towards the second extension straight line, the control unit then calculates an intermediate extension straight line for connecting the first extension straight line and the second extension straight line so that the vehicle is aligned with the second extension straight line while being prevented from colliding with any forward obstacle.

Further, the present invention provides a method of deriving a parking trajectory for a vehicle. More specifically, when a parking space is detected by an automatic parking system, a control unit in the automatic parking system is configured to calculate and set a parking target location to be within the parking space and individually calculate and set a first extension straight line, a second extension straight line, and an intermediate extension straight line. The first extension straight line may include a linear path of the vehicle when the vehicle initially begins to reverse from a neutral steering wheel position. The second extension straight line may include a forward/backward linear path from the vehicle to the vehicle's final destination in the parking space. The intermediate extension straight line may include a linear path connecting the first and second extension straight lines so that the vehicle reversing along the first extension straight line is aligned with the second extension straight line while at the same time being prevented from colliding with any forward obstacles.

As the vehicle travels along the first extension straight line, one or more sensors installed in the vehicle provide feedback to the control unit as to the location of the vehicle along the first extension straight line as it approaches the intermediate extension straight line. Once the vehicle approaches the intermediate extension straight line, the control unit turns and reverses the vehicle so that the vehicle is aligned with the intermediate extension straight line by controlling the steering wheel. Then again the one or more sensors installed in the vehicle provide feedback to the control unit as to the location of the vehicle along the intermediate extension straight line as it approaches the second extension straight line, and once the vehicle approaches the second extension straight line, the control unit turns and reverses the vehicle so that the vehicle is aligned with the second extension straight line by controlling the steering wheel, thus parking the vehicle within the final parking location.

Preferably, the first extension straight line may be set to any one of a number of linear paths along which the vehicle can turn and be then aligned with the intermediate extension straight line.

Preferably, an inclination of the intermediate extension straight line may be calculated so that the vehicle aligned with the intermediate extension straight line turns with a minimum radius of rotation and is then aligned with the second extension straight line.

Preferably, the second extension straight line may be set to a linear path having an inclination of a predetermined angle with respect to a longitudinal direction from the front to rear of the parking space when the length of the parking space is short.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
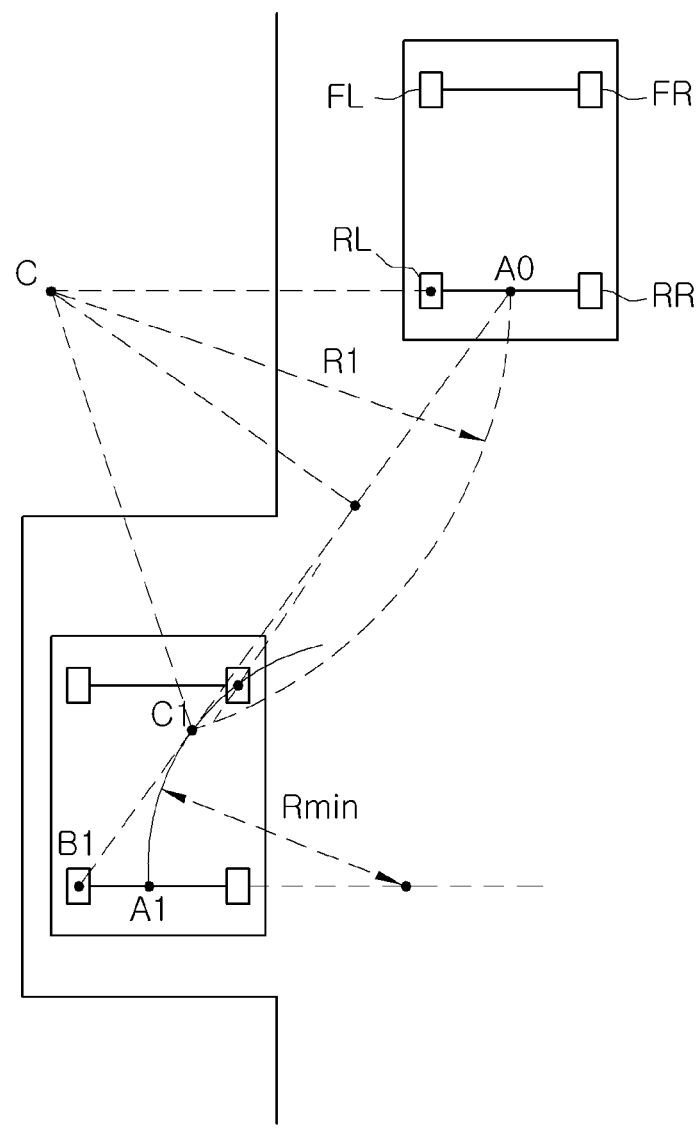
FIG. 1 is a diagram showing a conventional parking trajectory utilized to perform parallel parking.
Figure 2:
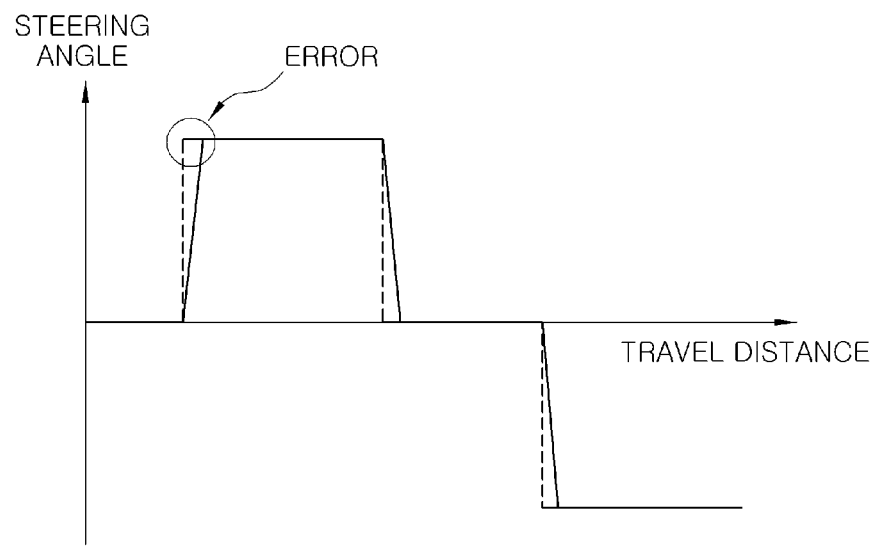
FIG. 2 is a diagram showing an erroneous area occurring when parking is performed in FIG. 1.
Figure 3:
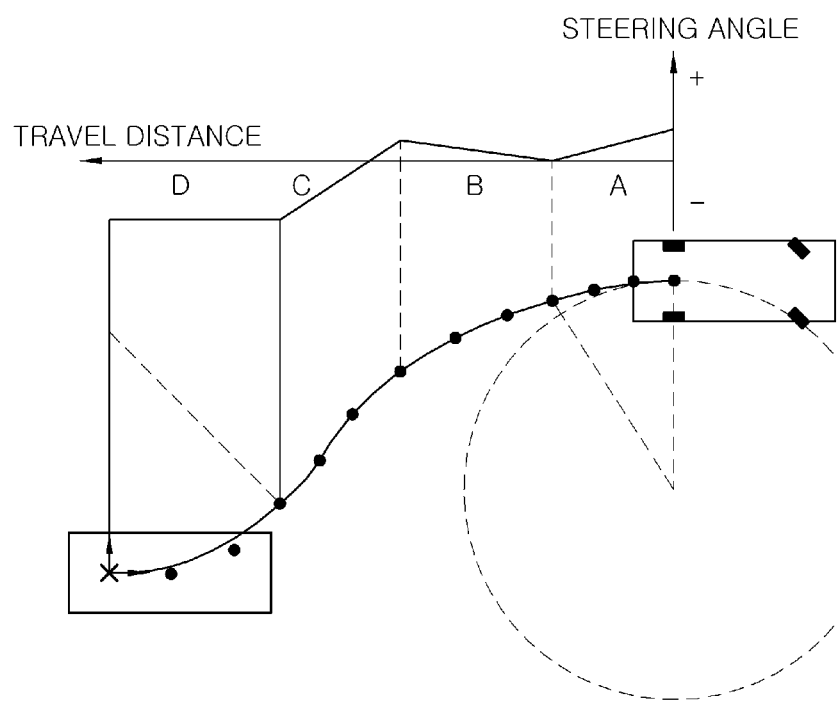
FIG. 3 is a diagram showing a conventional parking trajectory obtained in consideration of the characteristics of a steering motor.

Hereinafter, embodiments of the present invention will be described in detail with reference to the attached drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although the below exemplary embodiment is described as using a single control unit to perform the above process, it is understood that the above processes may also be performed by a plurality of control units, e.g., controllers.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In particular, a technique of deriving a parking trajectory for a vehicle according to the present invention shown in FIGS. 4 to 7 includes a first extension straight line calculation step, a second extension straight line calculation step, and an intermediate extension straight line calculation step. In the first extension straight line calculation step, a first extension straight line 10, is calculated once the vehicle begins to reverse toward the parking spot. The first extension straight line 10 may include a linear traveling path of a vehicle based upon the vehicle's position when the vehicle initially goes into reverse from a neutral steering position.

In the second extension straight line calculation step, a final parking location is obtained based on the calculated length of a parking space and a parking target location in the parking space, and a second extension straight line 30 based on a final parking location is calculated. In the intermediate extension straight line calculation step, an intermediate extension straight line 20 is calculated to connect the first extension straight line 10 and the second extension straight line 30 so that the vehicle is aligned with the second extension straight line 30 while being prevented from colliding with any forward obstacle when the vehicle turns and begins reversing towards the second extension straight line 30.

That is, the vehicle turns and goes in reverse along the first extension straight line 10, then along the second extension straight line 30, and then along the intermediate extension straight line, thus enabling the parking trajectory to be derived along the straight extension lines based on the angle of the radius of rotation within such a range that the vehicle does not collide with any forward vehicle. Therefore, since a procedure for deriving the parking trajectory is simple and is not complicated, the computational load of the parking trajectory can be reduced.

Here, the first extension straight line 10 is located in a diagonal portion of the front of the parking space on the basis of parallel parking, and may be set to be a line associated with a forward/backward linear direction based on the direction of travel of the vehicle. Further, the second extension straight line 30 is aligned with the final parking location in the parking space on the basis of parallel parking, and may be set to the line associated with a forward/backward linear direction based on the direction of travel of the vehicle. Furthermore, the intermediate extension straight line 20 is a connection path along which the vehicle enters from the first extension straight line 10 into the parking space, when parallel parking the vehicle, and is formed to have a predetermined inclination.

In this case, the inclination of the intermediate extension straight line 20 is preferably set to a maximum inclination so that the vehicle going in reverse along the first extension straight line 10 turns with the minimum radius of rotation and is then aligned with the intermediate extension straight line 20, and so that the vehicle going in reverse along the intermediate extension straight line 20 turns with the minimum of radius of rotation and is then aligned with the second extension straight line 30.

That is, in the case when the inclination of the intermediate extension straight line 20 is set to have the maximum angle possible, if the vehicle enters the parking space while turning with the minimum radius of rotation, the distance between the front and back perimeters of the of the amount of space required for parking can be minimized, so that parking is possible even in a small parking space.

Meanwhile, the technique of deriving a parking trajectory according to the present invention may include a parking location setting step, an extension straight line calculation step, a first sensing step, an entrance step, a second sensing step, and a parking step. In the parking location setting step, when a parking space is detected, a parking target location in the parking space is calculated and set. In the extension straight line calculation step, first and second extension straight lines 10 and 30 and an intermediate straight line 20 are individually calculated and set. Here, the first extension straight line 10 is a linear path when the vehicle initially begins to reverse from a neutral steering wheel position, and the second extension straight line 30 is a forward/backward linear path to a final parking location in the parking space. The intermediate extension straight line 20 is a linear path connected between the first extension straight line 10 and the second extension straight line 30 so that the vehicle going in reverse along the first extension straight line 10 is aligned with the second extension straight line 30 while as the same time being prevented from colliding with any obstacles (e.g., obstacles outside of the parking space.).

In the first sensing step, when the vehicle goes in reverse along the first extension straight line 10, one or more sensors installed on the vehicle sense that the vehicle is approaching the intermediate extension straight line 20. In the entrance step, when the vehicle is approaching the intermediate extension straight line 20, the steering wheel is controlled and then the vehicle turns and goes in reverse so that it is aligned with the intermediate extension straight line 20. In the second sensing step, when the vehicle goes in reverse along the intermediate extension straight line 20, one or more sensors installed on the vehicle sense that the vehicle is approaching the second extension straight line 30. In the parking step, when the vehicle is approaching the second extension straight line 30, the steering wheel is controlled, and then the vehicle turns and goes in reverse so that the vehicle is aligned with the second extension straight line 30, thus enabling the vehicle to be parked within the final parking location.

Information pertaining to the parking space and the extension straight lines can be calculated and the approach of the vehicle to the extension straight lines can be sensed, via using a Parking Assist System (PAS) sensor, a Smart Parking Assist System (SPAS) sensor, or the like installed in the vehicle. Such information is transmitted to the control unit, so that the vehicle is automatically parked using a Motor Driven Power Steering (MDPS) device or the like. In this case, as a means for recognizing the vehicle at intersections of the extension straight lines, a separate sensor other than the above sensors may be installed and perform the relevant function.

Figure 4:
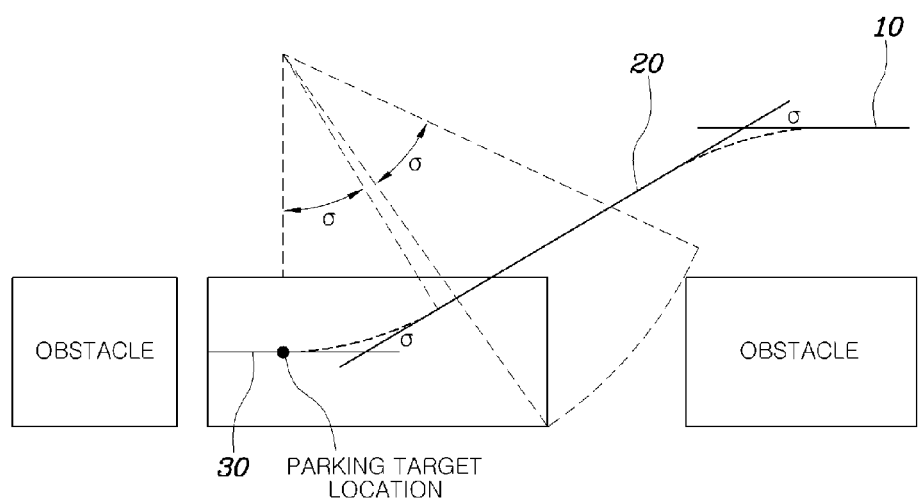
FIG. 4 is a diagram showing a parking trajectory upon performing parallel parking according to an exemplary embodiment of the present invention.

That is, as shown in FIG. 4, parking is performed by determining just the steering control time point based on an intersection of a straight line and another straight line in such a way that the vehicle is aligned with the intermediate extension straight line 20 while reversing along the first extension straight line 10, and is then finally aligned with the second extension straight line 30, thus enabling a procedure for deriving the parking trajectory to be very conveniently performed.

Here, $\sigma$ in FIG. 4 shows a turning angle at which a front right bumper can avoid colliding with any forward obstacle.

Further, the present invention provides a method of deriving a parking trajectory by recognizing intersections of a plurality of straight lines. Accordingly, even when an error in vehicle alignment along the intermediate extension line 20 occurs, the error caused by the intermediate extension straight line 20 is cancelled once the vehicle is aligned with the second extension straight line 30, thus enabling the vehicle to be parked in alignment with the second extension straight line 30.

Figure 5:
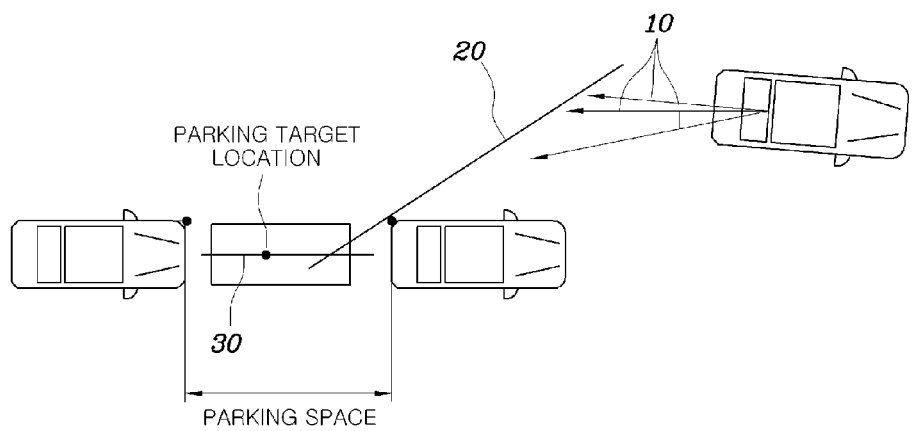
FIG. 5 is a diagram illustrating the change of the linear path of a first extension straight line according to the exemplary embodiment of the present invention.

As shown in FIG. 5, in the present invention, the first extension straight line 10 can be set to any one of a number of various linear paths along which the vehicle may turn and be aligned with the intermediate extension straight line 20. That is, the present invention derives the parking trajectory by recognizing intersection points at which the vehicle intersects a series of extension straight lines in a path trajectory toward the parking space. Therefore, even if the vehicle is oriented to the left or right of the first extension straight line 10 and an error occurs making it impossible for the vehicle to be aligned with the first extension straight line 10, the error caused by the first extension straight line 10 is canceled once the vehicle is aligned with the intermediate extension straight line 20 when the vehicle intersects the intermediate extension straight line 20. Therefore, the vehicle can go in reverse along the intermediate extension straight line 20 to the intersection of the intermediate extension straight line 20 and the second extension straight line 30.

Figure 6:
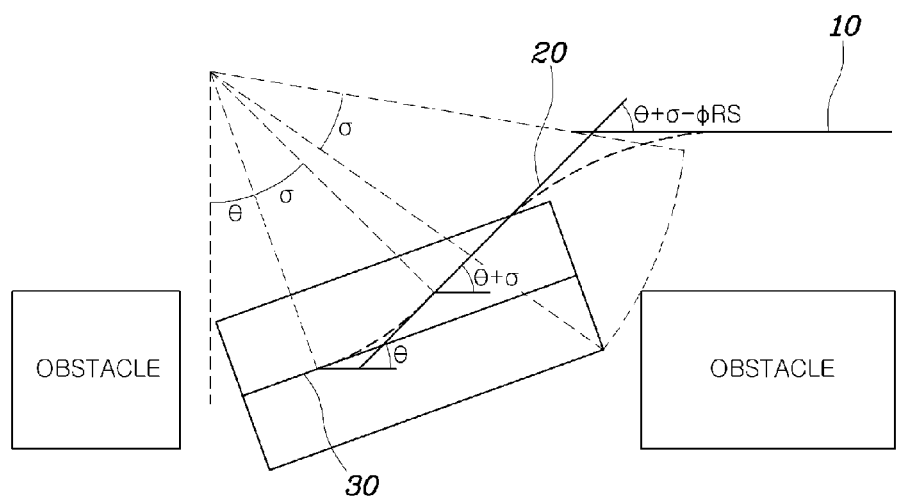
FIG. 6 is a diagram showing a parking trajectory when a parking space is narrow upon performing parallel parking according to the exemplary embodiment of the present invention.

As shown in FIG. 6, in the present invention, the second extension straight line 30 may be set to a linear path having a predetermined angle with respect to a longitudinal direction from the front to the rear of the parking space when the length of the parking space is shorter than an average parking space. That is, when the length of the parking space is not sufficient to allow the vehicle to be parked therein, the second extension straight line 30 is calculated so that it is inclined at a predetermined angle with respect to the longitudinal direction from the front to the rear of the parking space. As a result, the front portion of the vehicle is projected outwards from the parking space when the vehicle is aligned with the second extension straight line 30 rather than parallel to the curb to allow the vehicle to still fit in the space without hitting, e.g., vehicle in front and behind the vehicle being parked.

In FIG. 6, $\sigma$ denotes a turning angle at which the front right bumper of the vehicle can avoid colliding with any obstacles in the parking path, 8 denotes a final parking angle depending on the length of the parking space and ORS denotes the inclination angle of the vehicle when parking begins.

Figure 7:
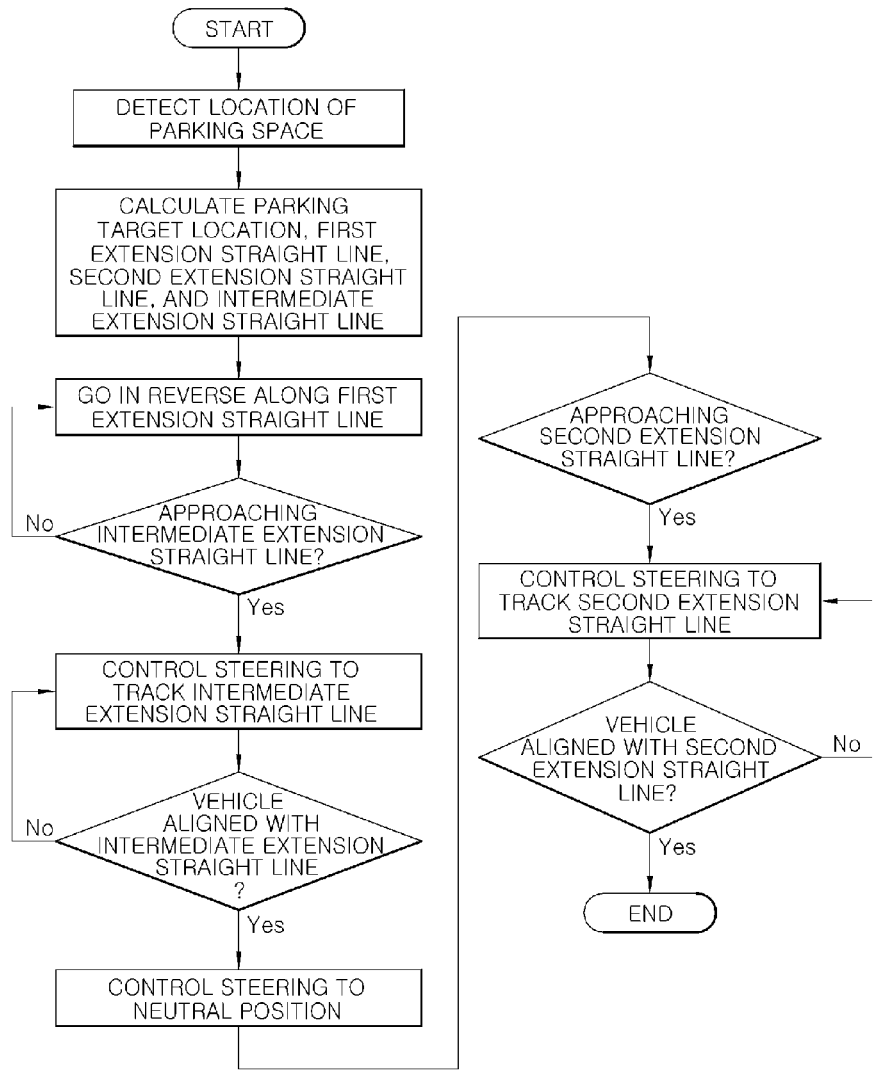
FIG. 7 is a flowchart showing the flow of a method of deriving a parking trajectory according to the exemplary embodiment of the present invention.

The operations and effects of the present invention will be described in detail with reference to FIG. 7.

A procedure in which the vehicle is automatically parked according to the present invention is described below. First, when the location of a parking space is detected, a first extension straight line 10, a second extension straight line 30, and an intermediate extension straight line 20 are calculated based on the angle of the radius of rotation, at which the vehicle does not collide with any forward obstacle, together with a parking target location, and are stored in a control unit.

Next, when the vehicle goes in reverse in a section in which the first extension straight line 10 is located, one or more sensors monitor or sense the vehicles position as the vehicle approaches the intermediate extension straight line 20.

When the vehicle approaches the intermediate extension straight line 20, the steering wheel is automatically controlled to steer the vehicle so as to track the path of the intermediate extension straight line 20, thus enabling the vehicle to be aligned with the intermediate extension straight line 20. Then, as the steering angle of the steering wheel is automatically controlled to the neutral position, as the vehicle goes in reverse along the intermediate extension straight line 20, one or more sensors monitor or sense the vehicles position as the vehicle approaches the second extension straight line 30.

When the vehicle approaches the second extension straight line 30, the steering wheel is automatically controlled to steer so as to track the path of the second extension straight line 30, thus enabling the vehicle to be aligned with the second extension straight line 30. Therefore, the vehicle can be automatically parked at the final parking location. In this case, settings may be implemented such that in the state in which the vehicle is finally parked in alignment with the second extension straight line 30, the steering angle of the steering wheel is automatically controlled to the neutral position.

Advantageously, the automatic parking system calculates three extension straight lines along the linear path along which the vehicle is moving upon performing parallel parking, and performs control such that the vehicle is steered at the intersections of the straight lines. Accordingly, deriving the parking trajectory is easy and convenient, thus reducing the computational load on the derivation of a parking trajectory. Based on this advantage, the present invention can be simply applied to various parking conditions.

Furthermore, the present invention is characterized in that even if the vehicle is not accurately aligned with the first extension straight line 10 and an error occurs, there is an advantage in that the steering angle is controlled so that once the vehicle intersects with the intermediate extension straight line 20, the vehicle turns and goes in reverse along the intermediate extension straight line 20. Furthermore, even if the vehicle is not accurately aligned with the intermediate extension straight line 20, and an error occurs, there is an advantage in that the steering angle is controlled once the vehicle intersect with the second extension straight line 30 turn and align the vehicle along the second extension straight line 30, thus eliminating errors immediately before the vehicle is finally parked.

As described above, the present invention is advantageous in that it calculates three extension straight lines along a movement path when a vehicle is parked, and performs control such that the vehicle is steered at the intersections of the straight lines, thus enabling the parking trajectory to be conveniently derived, with the result that the method of the present invention can be applied to various parking conditions.

Furthermore, the present invention is advantageous in that when an error occurs on a linear path along which the vehicle is moving before the vehicle enters a parking space, the steering angle is controlled so that the vehicle turns along a subsequent extension straight line at an intersection with the subsequent extension straight line, thus improving the accuracy of parking by reducing an error present before the vehicle entered the parking space when being parked.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of deriving a parking trajectory for a vehicle, comprising:
   calculating, by a control unit, a first extension straight line, which includes a linear travel path of the vehicle when the vehicle initially goes in reverse at a neutral position of a steering angle, upon going in reverse to be parked;
   obtaining, by the control unit, a final parking location based on a calculated length of a parking space and a parking target location in the parking space, and calculating a second extension straight line which includes the final parking location; and
   in response to the vehicle reversing along the first extension straight line and turning towards the second extension straight line, calculating, by the control unit, an intermediate extension straight line connecting the first extension straight line and the second extension straight line to align the vehicle with the second extension straight line while preventing the vehicle from colliding with any obstacles,
   wherein an inclination of the intermediate extension straight line is calculated so by the control unit that the vehicle aligned with the intermediate extension straight line turns with a minimum radius of rotation and is then aligned with the second extension straight line.

2. A method of deriving a parking trajectory for a vehicle, comprising:
   detecting, by an automatic parking system, a parking space for a vehicle;
   in response to detecting the parking space, calculating and setting, by the control unit a parking target location within the parking space;
   individually calculating and setting, by the control unit, a first extension straight line which is a linear traveling path of the vehicle when a vehicle initially begins to reverse from a neutral position of a steering angle, a second extension straight line which is a forward/backward linear travel path of the vehicle to a final parking location within the parking space, and an intermediate extension straight line which is a linear path connecting in a straight line the first and second extension straight lines so that the vehicle reversing along the first extension straight line is aligned with the second extension straight line while preventing the vehicle from colliding with any obstacles via sensor detection;
   sensing, by one or more sensors, the location of the vehicle as the vehicle travels along the first extension line and approaches the intermediate extension straight line;
   turning and moving the vehicle to be aligned along the intermediate extension straight line by controlling a steering wheel once the one or more sensors sense the vehicle has approached the intermediate extension straight line;
   sensing, by one or more sensors, the location of the vehicle as the vehicle travels along the intermediate extension line and approaches the second extension straight line; and
   turning and moving the vehicle to be aligned along the second extension straight line by controlling the steering wheel once the one or more sensors sense the vehicle has approached the second extension straight line to park the vehicle within the final parking location,
   wherein an inclination of the intermediate extension straight line is calculated so by the control unit that the vehicle aligned with the intermediate extension straight line turns with a minimum radius of rotation and is then aligned with the second extension straight line.

3. The method according to claim 2, wherein the first extension straight line is set to any one of a number of various linear paths along which the vehicle can turn and be then aligned with the intermediate extension straight line.

4. The method according to claim 2, wherein the second extension straight line is set to a linear path having an inclination of a predetermined angle with respect to a longitudinal direction from a front point to a rear point of the parking space when a length of the parking space is shorter than an average parking space.

5. A control system for deriving a parking trajectory for a vehicle, comprising:
one or more sensors installed within the vehicle and configured to detect the current location of the vehicle; and
a control unit configured to calculate a first extension straight line, which includes a linear travel path of the vehicle when the vehicle initially goes in reverse at a neutral steering position, obtain a final parking location based on a calculated length of a parking space and a parking target location in the parking space, calculate a second extension straight line which includes the final parking location; and calculate an intermediate extension straight line connecting the first extension straight line and the second extension straight line to align the vehicle with the second extension straight line while preventing the vehicle from colliding with any obstacles in response to the vehicle reversing along the first extension straight line and turning towards the second extension straight line,
wherein an inclination of the intermediate extension straight line is calculated so by the control unit that the vehicle aligned with the intermediate extension straight line turns with a minimum radius of rotation and is then aligned with the second extension straight line.

6. The system according to claim 5, wherein the first extension straight line is set to any one of a number of various linear paths along which the vehicle can turn and be then aligned with the intermediate extension straight line.

7. The system according to claim 5, wherein the second extension straight line is set to a linear path having an inclination of a predetermined angle with respect to a longitudinal direction from a front point to a rear point of the parking space when a length of the parking space is shorter than an average parking space.

8. A non-transitory computer readable medium containing program instructions executed by a processor or controller, the computer readable medium comprising:
program instructions that calculate a first extension straight line, which includes a linear travel path of the vehicle when the vehicle initially goes in reverse at a neutral steering position;
program instructions that obtain a final parking location based on a calculated length of a parking space and a parking target location in the parking space;
program instructions that calculate a second extension straight line which includes the final parking location; and
program instructions that calculate an intermediate extension straight line connecting the first extension straight line and the second extension straight line to align the vehicle with the second extension straight line while preventing the vehicle from colliding with any obstacles in response to the vehicle reversing along the first extension straight line and turning towards the second extension straight line,
wherein an inclination of the intermediate extension straight line is calculated so that the vehicle aligned with the intermediate extension straight line turns with a minimum radius of rotation and is then aligned with the second extension straight line.

9. The non-transitory computer readable medium according to claim 8, wherein the first extension straight line is set to any one of a number of various linear paths along which the vehicle can turn and be then aligned with the intermediate extension straight line.

10. The non-transitory computer readable medium according to claim 8, wherein the second extension straight line is set to a linear path having an inclination of a predetermined angle with respect to a longitudinal direction from a front point to a rear point of the parking space when a length of the parking space is shorter than an average parking space.

* * * * *